July 1, 1969 B. T. BERNSTEIN ET AL 3,453,647

THERMOGRAPHIC RECORDING APPARATUS

Filed March 24, 1965

INVENTORS
Benjamin T. Bernstein
Stefan Orsen
Melvin J. Zucker

BY Eli Weiss

ATTORNEY

United States Patent Office 3,453,647
Patented July 1, 1969

3,453,647
THERMOGRAPHIC RECORDING APPARATUS
Benjamin T. Bernstein, Metuchen, Stefan Orsen, Jersey City, and Melvin J. Zucker, Somerville, N.J., assignors to American Standard Inc., New York, N.Y., a corporation of Delaware
Filed Mar. 24, 1965, Ser. No. 442,242
Int. Cl. G01d 15/10, 15/12
U.S. Cl. 346—76 6 Claims

ABSTRACT OF THE DISCLOSURE

The recording mechanism employes a heat responsive record medium adjacent to which there is the central or bent portion of a U-shaped current carrying wire for producing the electrical effect to be recorded on the record medium. One of the legs of the U-shaped wire is associated with an electrical and thermal conductive means acting as a heat sink as well as a return conductor. The record medium may be continually preheated.

This invention pertains to information recorders and more particularly to apparatus for recording indicia on a heat responsive recording medium.

One class of information is termed as analog information and can result from monitoring continuously varying processes. Quite often such information is most easily interpreted by charts on which have been recorded curves related to the process. For example, in a chemical plant, data representing the pressure or temperature of the reactants may be converted to a curve on a record medium wherein the ordinate is a measure of the quantity being monitored.

There are presently available two types of chart recorders. One is the servo type wherein a motor drives a pen across the record medium such as paper to record the trace. The excursions of the motor driven pen are related to the amplitude of the quantity being monitored. While such a type is extremely rugged, it is slow acting because of the sluggish responses of the servo system and motor and also the inertia of the pen and its mechanical linkages to the motor. Another type of presently available chart recorder is the galvanometer type. In the galvanometer type, the writing stylus is mechanically coupled to an electrically energized galvanometer coil mechanism. Such a type is much faster in response than is the servo type. However, it is quite fragile. When the writing stylus is an optical element it also suffers from parallax distortion. In addition, both types are relatively expensive and can only record analog information.

The second class of information is classified as digital information. Digital information is represented by discrete symbols or combinations of these discrete symbols. The most common types of digital information are coded combinations of binary digits, decimal digits or alphabetic characters. The most common types of digital information recording devices available today are basically impression type printers. With the impression type printers, type faces carrying the symbols to be printed are struck against a recording medium. Generally, the type faces are inked so that a visible recording is made. All such printers are basically low speed devices. Their speed is generally limited to the inertia of the type face carrying means. Furthermore, because these printers are basically mechanical in nature they suffer from the usual mechanical wear due to friction.

It is accordingly, a general object of the invention to provide an improved apparatus for recording indicia on a record medium.

It is another object of the invention to provide an improved indicia recording apparatus which aside from the transport mechanism for the record medium has no moving parts.

It is a further object of the invention to provide an improved apparatus for recording indicia which is on the one hand extremely fast in operation and on the other hand very rugged.

It is a still further object of the invention to provide an improved indicia recording apparatus which while satisfying any or all of the above objects is highly reliable and relatively inexpensive.

It is yet a still further object of the invention to provide indicia recording apparatus which can record either analog or digital information.

Briefly, the invention contemplates the recording of indicia on a heat responsive record medium. The indicia is recorded by apparatus which comprises a wire-like electrical element. The element has a bent portion and two legs extending from the bent portion. The bent portion is adapted to be positioned operatively close to the record medium. An electrical insulating means surrounds one of the legs of the element and is in thermal contact therewith. An electrical and thermal conductive means is in contact with the other leg of the element. The one leg is adapted to receive an electric current, which the electrical and thermal conductive means performs the dual function of being a heat sink and an electric current return. Accordingly, when an electric current is applied to the one leg, the bent portion of the element heats and reaches a temperature sufficient to record an indicium on the opposed portion of the thermosensitive record medium.

A feature of the invention contemplates preheating the record medium to increase the speed of recording.

Other objects, features and the advantages of the invention will be apparent from the following detailed description when read with the accompanying drawings which show, by way of example and not limitation, the now preferred embodiment of an indicia recording system for practicing the invention.

Figures 1, 2, 3, 4:
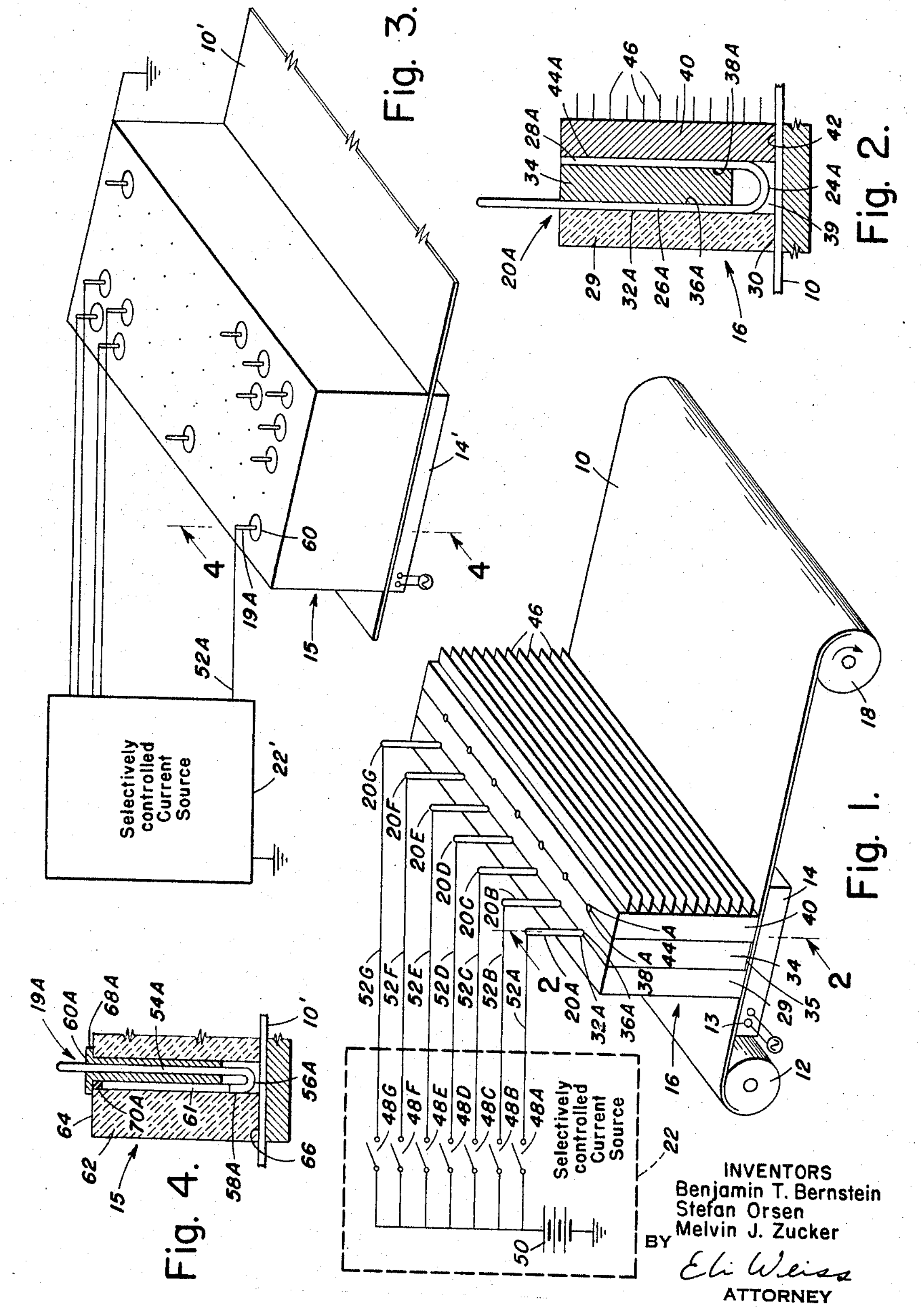
FIG. 1 shows a perspective view of an indicia recording system wherein a heat responsive record medium is moved past a multielement recording heat which is selectively energized by a current source.
FIG. 2 is a cross-sectional view through the recording head and taken through the line 2—2 of FIG. 1.
FIG. 3 is a block diagram of a system similar to FIG. 1 showing an alternate embodiment of the recording head which is useful in recording digital symbols.
FIG. 4 is a cross-sectional view through a portion of the recording head of FIG. 3 and taken through the line 4—4 thereof.

Referring to FIG. 1, a heat responsive record medium 10 is drawn from an output roller 12 between a platen 14, in which is transversely embedded a preheating element 13, and a multichannel recording head 16 to a take-up roller 18 which is driven by means not shown. As record medium 10 moves it is first preheated to raise its sensitivity and then moves past recording head 16. Current flowing from selectively controlled current source 22 is fed to the electrical resistance elements 20, one associated with each channel, to cause the recording of lines of indicia on the record medium 10 opposite any of the elements then receiving current. It should be noted that the preheating is only sufficient to raise the sensitivity of record medium 10 but insufficient of itself to change the visual appearance of the record medium. The line will have a length which is a function of the time duration of a received current pulse and the velocity of movement of the record medium 10 past the recording head 16. It should therefore be apparent that by suitably coding the current pulses with respect to time and with respect to channel it is possible to represent any smoothly varying curve. Furthermore, again by controlling the current pulses with respect to time and with respect to channel it is possible to "dot print" numeric or alphabetic symbols.

The various portions of the system will now be described. The heat responsive record medium 10 is a roll of paper whose specific portions will char, turn brown, etc., when subjected to a temperature greater than a given value. A variety of commercially available papers in the form of rolls may be used. The drive means may be a continuously rotating motor coupled to the shaft of the take-up roller 18. If precise recordings are desired that are insensitive to the diameter of the paper accumulated on take-up roller 18 it would be desirable to use a conventional capstan drive means. The platen 14 may be heated to preheat the moving paper below the charring point prior to recording of the information. The preheating of the paper to just below the charring point facilitates the recording by lowering the response time and minimizing the current requirements of the reproducing head 16. Platen 14 can be heated by embedded heating elements and is basically, a flat plate which may be spring biased to press the record medium 10 against the recording head 16 and includes heating element 13 embedded therein and disposed transverse to the direction of motion of record medium 10 and "upstream or ahead" of recording head 16.

Recording head 16 is best described by making reference to both FIGS. 1 and 2. Recording head 16 as shown is a seven channel recording head. Each channel includes a wire-like electrical resistance element 20. A typical element 20A for the first channel is shown in FIG. 2. Element 20A is "hair-pin" shaped, and includes: a U-shaped bent portion 24A that is opposite and slightly displaced from record medium 10; a first leg 26A; and a second leg 28A. Each of the legs extends upward from U-shaped bent portion 24A. There is a first slab-like member 29 of electrical insulating material such as a ceramic. The bottom face 30 of member 29 is against record medium 10. Grooves 32 are formed in the inner face of member 29. The grooves 32 as shown in FIGS. 1 and 2 are vertical and spaced from each other. The cross-section of a typical groove 32A is such that it will swagingly accommodate the first leg 26A of electrical resistance element 20A. A second slab-like member 34 is positioned between the legs 26 and 28. A first side face of member 34 includes a plurality of vertical grooves 36. A typical groove 36A has a cross-section so that it swagingly accommodates the first leg 26A. The first side face of member 34 and the inner face of member 29 are fixed together by gluing or the like with their grooves aligned so that each of the first legs 26 of the elements 20 are spaced from each other and electrically insulated from each other. The other side face of member 34 is also provided with grooves. Grooves 38 extend vertically. A typical groove 38A has a cross-section to swagingly accommodate the second leg 28A. The bottom face 35 of member 34 is against record medium 10. Face 35 is provided with a plurality of horizontal grooves 39. Each of the grooves 39 accommodates one of the U-shaped bent portions 24. The depth of the grooves 39 is such that the bent portions 24 do not come in contact with record medium 10. A third slab-like member 40 has a bottom face 42 which rests against record medium 10. Member 40 also has an inner face which has a plurality of vertical extending grooves 44. A typical groove 44A has a cross-section for swagingly accommodating legs 28A. The inner face of member 40 is fixed to the second face of member 34 by glue or the like with the vertically extending grooves thereof in opposed relationship so that the legs 28 are separated from each other. Member 40 is made of a metal which is a good electrical and thermal conductor. In fact, the outer face of member 40 may be provided with fins 46 to act as a heat radiator. Member 40 acts as a heat sink and is also connected to ground (see FIG. 1) to provide a current return.

Selectively controlled current source 22 is shown comprising a plurality of single-pole single-throw switches 48 for selectively connecting current source 50 via leads 52 to the electrical resistance elements 20. Although the switching means has been shown as manually operable toggle switches, it will be apparent that, in practice, these switches will generally be replaced by electronic switching means under the control of a telemetering receiver, a computer, analog-to-digital converter or the like.

During operation, when any one of the switches 48 is closed, as for example switch 48A, current will flow from current source 50 through switch 48A and line 52A to the first leg 26A of electrical resistance element 20A. The current then flows from the first leg 26A via the U-shaped bent portion 24A to the second leg 28A. The current then flows in third member 40 and via ground back to the current source 50. Since the resistance element 28A has a high electrical resistance, heat is generated which is proportional to the product of the square of the current and the resistance of the element. However, because of the intimate contact of the first and the second legs 26A and 28A with members 29, 34 and 40, heat accumulates only in the U-shaped bent portion 24A. The heat in the legs 26A and 28A is drawn off by the members 29, 34 and 40. The concentration of heat at the portion 24A raises the temperature of the opposed portion of record medium 10 above the preheating temperature resulting from contact with heated platen 14, and that portion of record medium 10 changes color or chars. As long as current flows through electrical resistance element 20A, portion 24A remains at a high temperature and the portion of the record medium 10 under portion 24A changes color so that the length of time of the flow of current will determine the length of the colored line so generated. When switch 48A is open current stops flowing and the heat in portion 24A is rapidly drawn off by the heat sink provided by member 40.

The system of FIG. 3 will now be described. The system of FIG. 3 is in many respects similar to FIG. 1. The chief difference being in the recording head 15. Since there is a great similarity between the two systems, primed reference characters will be used for like elements and only the difference will be discussed in detail. Recording head 15 is basically a seven-by-five matrix of electrical resistance elements 19. A seven-by-five matrix is convenient for "dot printing" the usual alpha-numeric characters generally used in conventional data processing systems. A heat responsive record medium 10' is driven between a platen 14' and a recording head 15, selected ones of the electrical resistance elements 19 receive current from selectively controlled current source 22'. The heat generated by the selectively energized electrical resistance elements 19 is used to "print dots" on the record medium 10'.

The details of a typical electrical resistance element 19A is shown in FIG. 4. Element 19A is a wire-like element of high electrical resistance material bent in the form of a hook. Element 19A includes a first leg 54A, a U-shaped bent portion 56A and a second leg 58A. The U-shaped bent portion 56A is positioned opposite record medium 10' and spaced therefrom. A sleeve 60A having a central inner surface and an outer surface surrounds leg 54A. Sleeve 60A is of an electrically insulative material. Furthermore, sleeve 60A is in intimate contact with leg 54A to enhance maximum heat transfer from leg 54A to sleeve 60A. Sleeve 60A extends over the full length of leg 54A into the U-shaped region so that the leg 58A rests on the outer surface of sleeve 60A. The combination of sleeve 60A and element 19A is fitted into passageway 61 of plate 62. The passageway 61 extends from the top face 64 to the bottom face 66 of plate 62. Bottom face 66 rests against record medium 10'.

A lip 68A on sleeve 60A prevents downward movement of the sleeve. Furthermore, an abutment 70A on sleeve 60A and the outer edge of leg 68A abut the inner wall of passageway 61 to prevent any wobble of the sleeve in the passageway. Furthermore, the contact between leg 58A and the inner wall of passageway 61 insures a good electrical and thermal connection between the element 19A and the plate 62. Plate 62 of a good metallic conductive material serves both as a heat sink and a current return, in the same manner, as the member 40 of FIG. 1.

The system of FIG. 3 operates in the same manner as the system of FIG. 1. For example, if selectively control current source 22′ passes current via lead 52A to electrical resistance element 19A current flows into the leg 54A of the element and via the U-shaped bent portion 56A and the leg 58A to the plate 62 where it returns via ground to the source 22′. The current flowing in element 19A generates heat particularly in the U-shaped bent region 56A causing the portion of the record medium 10′ opposite portion 56A to char or change color.

While only a limited number of electric resistance elements has been shown for each of the recording heads, it should be apparent that, by increasing the number of elements, the resolution and the quality of the printed indicia can be improved.

There has thus been shown improved apparatus for recording indicia on a heat responsive record medium which by using wire-like electrical resistance elements having U-shaped bent portions with legs extending therefrom can cheaply and reliably record indicia. The apparatus, by virtue of its construction, requires no moving parts, and is, therefore, fast operating and long lived.

While only two embodiments of the invention have been shown and described in detail, there will now be obvious to those skilled in the art many modifications and variations satisfying many or all of the objects of the invention but which do not depart from the spirit thereof as defined in the appended claims.

We claim:

1. Indicia recording apparatus for use with a paper recording medium, said apparatus comprising a wire-like electrical resistance element including a U-shaped bent portion and first and second legs extending from said U-shaped bent portion, said U-shaped bent portion being adapted to be positioned operatively opposite the paper recording medium, a first member of electrically insulating material including at least a bottom face portion for positioning against the paper recording medium and an inner face portion, said inner face portion being provided with a groove for swagingly accommodating said leg of said electrical resistance element, a second member of electrically insulating material positioned between the legs of said electrical resistance element, said second member including at least two side face portions, each of said side face portions being provided with a groove for swagingly accommodating one of the legs of said electrical resistance elements respectively, a third member of electrically and thermally conductive material including at least a bottom face portion for positioning against the paper recording medium and an inner face portion, said inner face portion being provided with a groove for swagingly accommodating said second leg of said electrical resistance element, said first leg being adapted to receive an electric current, and said third member providing both a heat sink and an electric current return so that when electric current is applied to said first leg the U-shaped bent portion of said electrical resistance element reaches a temperature sufficient to record an indicium on the portion of the paper recording medium opposite said U-shaped bent portion.

2. Indicia recording apparatus for use with a paper recording medium, said apparatus comprising a wire-like electrical resistance element including a U-shaped bent portion and first and second legs extending from said U-shaped bent portion, said U-shaped bent portion being adapted to be positioned opposite the paper recording medium, a sleeve of electrically insulating material including a central inner surface portion and an outer surface portion, said sleeve surrounding said first leg and extending to said U-shaped bent portion of said electrical resistance element, so that said second leg is opposite said outer surface portion, said central inner surface portion being in thermal contact with said first leg, and a plate of electrically and thermally conductive material including a face portion for positioning against said paper recording medium and being provided with a through passageway opening into said face portion, said passageway having a diametral dimension for accommodating said sleeve and said electrical resistance element so that said second leg contacts the wall of said passageway, said first leg being adapted to receive an electric current, and said plate providing both a heat sink and an electric current return so that when electric current is applied to said first leg the U-shaped bent portion of said electrical resistance element reaches a temperature sufficient to record an indicium on the portion of the paper recording medium opposite said U-shaped bent portion.

3. Apparatus for recording indicia on a paper recording medium comprising: a plurality of wire-like electrical resistance elements, each of said electrical resistance elements including a bent portion and first and second legs extending from said bent portion, said bent portion being adapted to be positioned opposite the paper recording medium; a plurality of sleeves of insulative material, each of said sleeves including a central inner surface portion and an outer surface portion, each of said sleeves surrounding the first leg of one of said electrical resistance elements, respectively, with thermal contact between said inner surface portion and the associated first leg; a member of electrically and thermally conductive material for providing a heat sink and an electrical current return, said member being provided with a plurality of openings, each of said openings accommodating one of said sleeves surrounding the first leg of an electrical resistance element and the second leg being in thermal and electrical contact with said member; and means for controllably feeding electric current to selected ones of said first legs so that the bent portions of the electrical resistance elements receiving electric current heat to a temperature sufficient to record indicia on portions of the paper recording medium.

4. Indicia recording apparatus for use with a paper recording medium, said apparatus comprising: a plurality of wire-like electrical resistance elements, each of said electrical resistance elements including a U-shaped bent portion and first and second legs extending from said U-shaped bent portion, said U-shaped bent portion being adapted to be positioned opposite the paper recording medium; a first member of electrically insulating material including at least a bottom face portion for positioning against the paper recording medium and an inner face portion, said inner face portion being provided with a plurality of grooves, each of said grooves swagingly accommodating the first leg of one of said electrical resistance elements; a second member of electrically insulating material positioned between the first and second legs of each of said electrical resistance elements, said second member including at least two side face portions, one of said side face portions being provided with a plurality of grooves, each of said grooves swagingly accommodating one of the first legs of said electrical resistance elements, said one side face portion of said second member being fixed against the inner face portion of said first member with their grooves disposed opposite each other so that the first legs of said electrical resistance elements are spaced and electrically insulated from each other, the other of said side face portions being provided with a plurality of grooves, each of said grooves swagingly accommodating the second leg of one of said electrical resistance elements; a third member of electrically and thermally conductive material including at least a bottom face portion for positioning against the paper recording medium and an inner face portion, said inner face portion being provided with a plurality of grooves, each of said grooves swagingly accommodating the second leg of one of said electrical resistance elements, the inner face of said third member being fixed against said other side face of said second member with their grooves disposed opposite each other so that the second legs are spaced from each other; and means for controllably feeding electric current to selected ones of said first legs so that the bent portions of the electrical resistance elements receiving electric current heat to a temperature sufficient to record indicia on portions of the paper recording medium.

5. Apparatus for recording indicia on a paper recording medium comprising: a plurality of wire-like electrical resistance elements, each of said electrical resistance elements including a bent portion and first and second legs extending from said bent portion, said bent portion being adapted to be positioned opposite the paper recording medium; a plurality of sleeves of electrically insulating material, each of said sleeves including a central inner surface portion and an outer surface portion, each of said sleeves surrounding the first leg of one of said electrical resistance elements, respectively, and extending to its bent portion so that the second leg of said one of said electrical resistance elements is opposite said outer surface portion, the central inner surface portion of each of said sleeves being in thermal contact with the first leg of the associated electrical resistance elements; a plate of electrically and thermally conductive material including a face portion for positioning against said paper recording medium and being provided with a plurality of through passageways opening onto said face portion, each of said passageways having a diametral dimension for accommodating one of said sleeves and its associated electrical resistance element so that the second leg thereof contacts the wall of said passageway; and means for controllably feeding electric current to selected ones of said first legs so that the bent portions of the electrical resistance elements receiving electric current heat to a temperature sufficient to record indicia on portions of the paper recording medium.

6. Apparatus for recording indicia on a heat responsive record medium comprising a platen over which the record medium moves, said platen including means for raising the temperature of said record medium to a point below the threshold of a visible change in the record medium; and a recording head disposed opposite said platen and the record medium thereon, said recording head comprising a plurality of wire-like electrical resistance elements, each of said electrical resistance elements including a bent portion and first and second legs extending from said bent portion, said bent portion being adapted to be positioned opposite the heat responsive record medium; a plurality of sleeves of insulative material, each of said sleeves including a central inner surface portion and an outer surface portion, each of said sleeves surrounding the first leg of one of said electrical resistance elements, respectively, with thermal contact between said inner surface portion and the associated first leg, a member of electrically and thermally conductive material for providing a heat sink and an electrical current return, said member being provided with a plurality of openings, each of said openings accommodating one of said sleeves surrounding the first leg of an electrical resistance element and the second leg of said electrical resistance element, said second leg being in thermal and electrical contact with said member, and means for controllably feeding electric current to selected ones of said first legs so that the bent portions of the electrical resistance elements receiving electric current heat to a temperature sufficient to record visible indicia on portions of the heat responsive record medium.

References Cited

UNITED STATES PATENTS

| | | | |
|---|---|---|---|
| 2,454,966 | 11/1948 | Faus | 346—76 |
| 2,922,688 | 1/1960 | Boyan | 346—76 |
| 2,934,395 | 4/1960 | Basiago | 346—76 |
| 3,134,094 | 5/1964 | Anderson | 346—76 |
| 3,161,457 | 12/1964 | Schroeder | 346—139 |
| 3,163,489 | 12/1964 | Borne | 346—76 |
| 3,327,314 | 6/1967 | Zeuthen | 346—76 |
| 3,145,071 | 8/1964 | Vance | 178—30 |
| 3,354,817 | 11/1967 | Sakurai | 346—74 |

FOREIGN PATENTS

| | | |
|---|---|---|
| 747,633 | 4/1956 | Great Britain. |

BERNARD KONICK, *Primary Examiner.*

L. J. SCHROEDER, *Assistant Examiner.*

U.S. Cl. X.R.

346—74